United States Patent [19]
Kurichh

[11] 3,823,987
[45] July 16, 1974

[54] AIR BRAKE ANTILOCK CONTROL
[75] Inventor: Sham L. Kurichh, Owosso, Mich.
[73] Assignee: Midland-Ross Corporation, Cleveland, Ohio
[22] Filed: June 18, 1973
[21] Appl. No.: 370,599

[52] U.S. Cl. ............................................. 303/21 F
[51] Int. Cl. .............................................. B60t 8/12
[58] Field of Search ......... 303/21 CF, 21 CG, 21 C, 303/21 CE, 21 F, 68–69; 188/181 A

[56] References Cited
UNITED STATES PATENTS
3,188,148  6/1965  Eaton .............................. 303/21 F
3,744,853  7/1973  Cullen et al. ..................... 303/21 F Primary Examiner—Duane A. Reger
Assistant Examiner—Jesus D. Sotelo
Attorney, Agent, or Firm—Irvin L. Groh

[57] ABSTRACT

An antilock control valve for use with an air brake system on a vehicle which also includes an antilock control system capable of detecting actual or potential locking of the braked wheels and providing a signal to actuate the antilock valve. The antilock valve provides for unrestricted operation of the brakes until a lock signal is received at which time the brakes are automatically released and further delivery of control air is prevented until the braked wheels resume rotational speed. After the wheel lock condition is avoided, the brakes are reapplied at a controlled rate due to a restriction in the line delivery air for operation of the brakes.

12 Claims, 4 Drawing Figures

PATENTED JUL 16 1974  3,823,987

PATENTED JUL 16 1974　　　　　　　　3,823,987

AIR BRAKE ANTILOCK CONTROL

SUMMARY OF THE INVENTION

This invention relates to air brake systems for vehicles and more particularly to systems employing antilock or antiskid features.

The supply of compressed air on a vehicle equipped with air brakes is constantly being depleted during braking operation since the release of the brakes requires exhausting air from the brake applying actuators. Antiskid or antilock devices which automatically exhaust air to release the brakes and supply air to apply the brakes often respond slowly and as a consequence use large quantities of air which results in over-release and over-application of the brakes. Alternatively, the devices become complex and although air may be used more efficiently in the antilock phase of braking operation, the various components inhibit the flow of air and detract from normal braking operations. This type of operation makes some devices completely unacceptable particularly in view of safety standards which regulate not only stopping distances but also the speed at which air must flow to both apply and release the brakes.

Prior art devices also have used numerous moving parts, particularly valves which operate only during the antilock phase which usually is infrequent. Because of the long periods of inactivity the valves tend to stick and become inoperative or delay operation at the most critical time when antilock braking operation is needed.

It is an object of the invention to provide an antilock device for an air brake system in which the rate of brake reapplication is controlled at a rate conserving air.

Another object of the invention is to provide an air brake antilock control system in which the rate at which air is delivered to brake applying means is restricted in response to the control line air pressure at the time the anitlock cycle begins.

A further object of the invention is to provide an air brake antilock control in which the various moving components producing the controlled rate of brake reapplication in the antilock cycle may be cycled periodically at the discretion of the operator without actually encountering antilock conditions.

An air brake antilock control is provided in which the rate at which the brakes are reapplied after they have been released in an antilock cycle of operation is regulated by a restrictor means which limits the rate at which air can be supplied to apply the brakes. The restrictor element responds to control line pressure at the time the antilock cycle begins and maintains a constant metering of the air until the entire antilock cycle is completed. Thereafter the restrictor returns to its inoperative position in which it offers no resistance to the flow of air during normal braking operations. The restrictor is so arranged that it can be moved in its range of antilock operation in the absence of an antilock signal to insure periodic movement and the capability of moving under antilock conditions.

DETAILED DESCRIPTION

Figure 1:
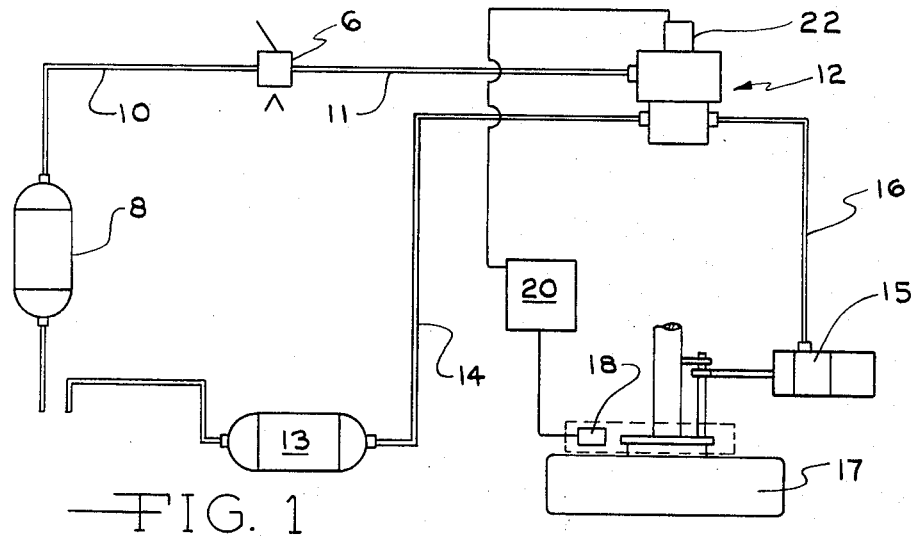
FIG. 1 is an schematic diagram of a vehicle brake system incorporating the antilock valve embodying the present invention.

Refering to the drawings and particularly to FIG. 1, the air brake system incorporating an embodiment of the present invention includes a conventional foot operated treadle valve 6 connected to an air line 11 to the brake receiving air from a control reservoir 8 through a line 10 and delivering air through antilock valve assembly 12. Also connected to the antilock valve assembly 12 is a service reservoir 13 which delivers air to the antilock valve by way of line 14 from which it is conveyed to brake actuators, one of which is indicated at 15 by way of a line 16. Operation of the foot valve 6 delivers air at a regulated pressure to the line 11 to the antilock valve assembly 12 which in turn controls the delivery of air from the service reservoir 13 through the line 14 to the antilock valve assembly 12, and through line 16 to the brake actuator 15. Delivery of air pressure to the brake actuator 15 causes the brakes associated with a wheel 17 to be actuated and the exhaust of air causes the brakes to be released.

Also associated with the wheel is a sensor 18 of any known type which is effective to measure the speed of the wheel and to deliver the speed information electrically to a computer 20 which in turn computes the acceleration or deceleration rates of the wheel 17 and transmits the resultant signal to energize or de-energize a solenoid 22 forming part of the antilock valve assembly 12 to modulate the braking as will be more fully described hereafter.

Figure 2:
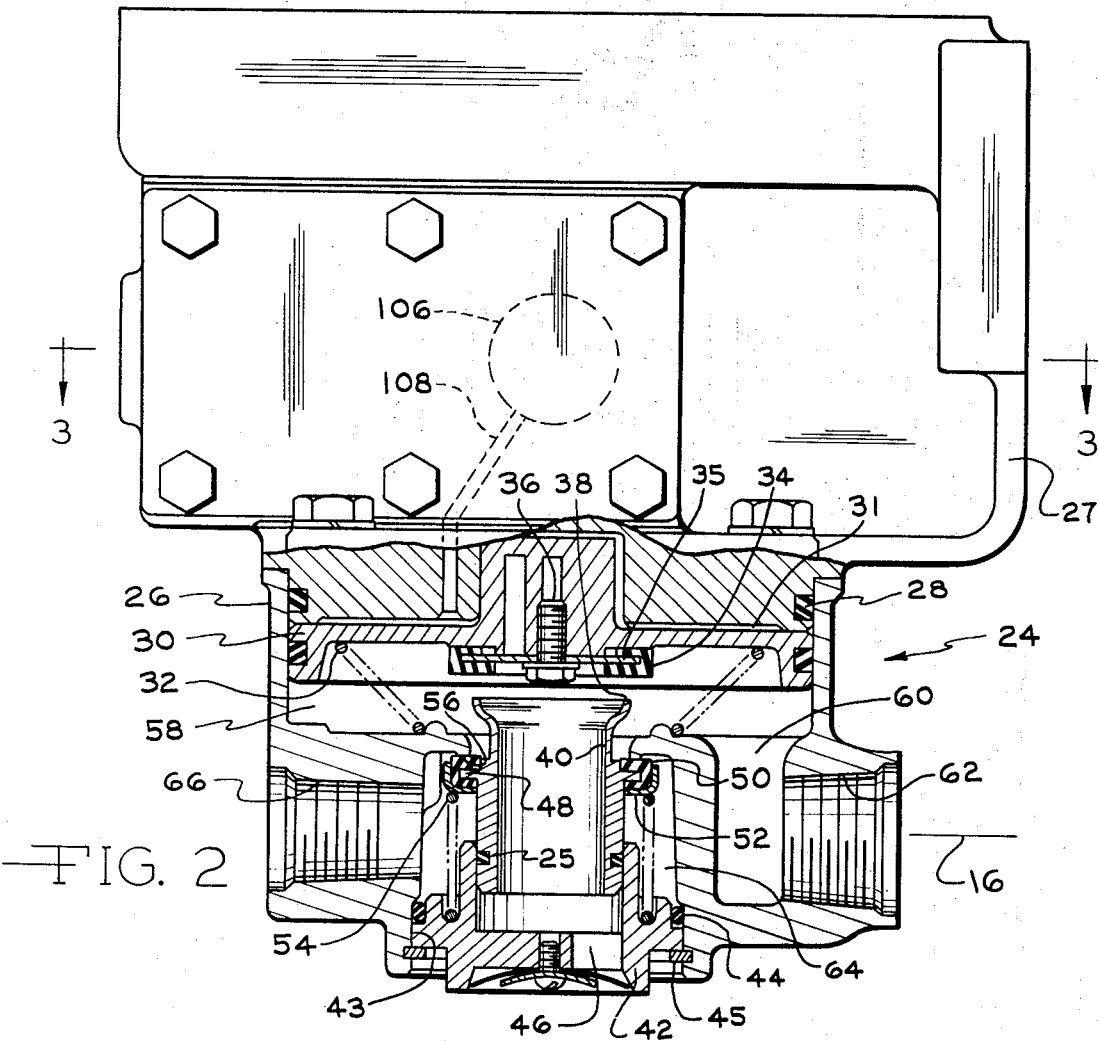
FIG. 2 is a side elevation partly in section showing the antilock valve.

Referring now to FIG. 2, the antilock valve assembly 12 includes a relay valve section 24 at the bottom portion of the antilock valve assembly 12. The relay valve section 24 includes a generally hollow housing 26 which is sealed relative to an upper housing structure 27 by means of seal 28 and is fastened thereto by any conventional manner as by bolts (not shown).

A piston 30 is slidably disposed within the hollow housing and forms a control chamber 31 at its upper side. The delivery of air pressure to the control chamber 31 causes the piston 30 to move downwardly against the biasing action of a spring 32. The central portion of the piston 30 is formed with a rubber-like valve element 34 which has reinforcing plate 35 which is held at the axis of the piston by means of a screw fastener 36. The valve element 34 is adapted to engage a lip 38 formed on the upper end of a tubular member 40. The tubular member 40 is disposed to slide in an end cap 42 which is disposed in an opening 43 in the lower end of housing 26. The end cap 42 is sealed relative to the wall of the opening 43 by a seal 44 and is held in fixed position by means of a snap ring 45. The end cap is formed with an exhaust opening 46 which communicates the interior of the tube 40 with the atmosphere. An intermediate exterior portion of the tubular member 40 is formed with flange 48 which receives an annular rubber element 56 having a U-shaped cross section. The element 48 is held on the flange by a retaining ring 52 which forms a seat for one end of a spring 54 having its other end acting on the end cap 42 to urge the valve element 50 into engagement with an annular lip 56 formed internally of the relay housing. A seal 25 on the exterior of the tubular member 40 prevents fluid communication between cavity 64 and the atmosphere.

In the position shown, the interior of the tubular member 40 communicates by way of the exhaust opening 46 with the atmosphere and by way of the open upper end of the tube, with a large cavity 58 formed in the housing 26 below the piston member 30. The cavity 58 is also in communication by way of an axially offset passage 60 with a delivery port 62 which is adapted for connection with the line 16 to the brake actuator 15. In the position shown, with the valve element 50 seated on the annular lip 56, an annular chamber 64 is formed around the exterior of the tubular member 40 which is in communication with an inlet port 66 connected to the line 14 and the service reservoir 13.

Upon delivery of air pressure to the control chamber 31 above the control piston 30, the valve element 34 moves downwardly to engage the annular lip 38 to close the upper end of the tube 40 and isolate the delivery port 62 from the exhaust port 46. Subsequently downward movement of the control piston 30 operates to move the tubular 40 downwardly in the end cap 42 and moves the valve element 50 out of engagement with the annular lip 56. This places the large cavity 58 below the control piston 30 in communication with the inlet port 66 from the service reservoir 13 while maintaining the large cavity 58 isolated from the exhaust port 46 by way of the valve element 34 closed on the annular lip 38 of the tube 40.

It will now be seen that the relay valve section 24, in the position shown, serves to communicate the delivery port 62 with the exhaust port 46, in which case the air brake chamber 15 is exhausted and the brakes at the wheel 17 of the vehicle is released. Upon downward movement of the control piston 30 in response to air pressure in the control chamber 31 above the piston, the brake chamber 15 and the delivery port 62 is isolated from the exhaust port 46 by the valve 34 closing on the end of the tubular member 40, and subsequently the air pressure existing in the service reservoir 13 is made available through the delivery port 66 and through the open valve 50, 56 to the large cavity 58 and from there to the axially offset passage 60 to the delivery port 62 and to the brake actuators 15. Consequently, air is delivered from the service reservoir 13 to the brake actuator 15 to apply the brakes.

Figure 3:
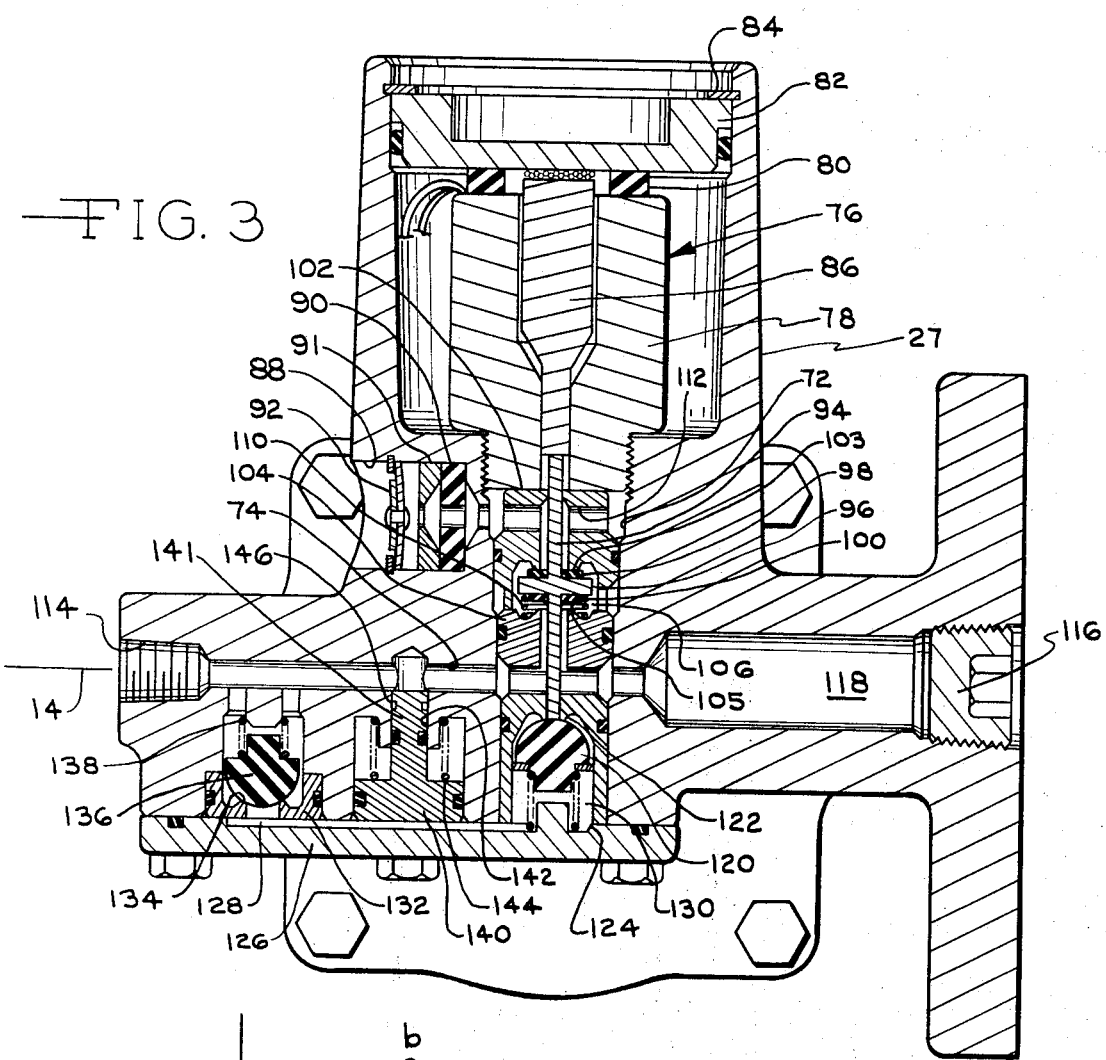
FIG. 3 is a sectional view taken on line 3—3 in FIG. 2.

The means by which the delivery of air to the control chamber 31 is accomplished will best be understood by referring to FIG. 3 showing the details within the upper housing structure 27 of the antilock valve assembly 12.

The upper housing structure 27 includes a generally hollow housing having a stepped bore 72 and an intersecting cross bore 74. One end of the bore 72 receives a solenoid 76 having an armature 78 held in position in the bore 72 by menas of a seal 80 and an endcap 82 which is sealed relative to the internal walls of the bore 72 and held in position by a snap ring 84. Disposed within the solenoid armature is a solenoid plunger 86 which upon energization of the solenoid 76 moves axially within the armature 78.

Communicating with an intermediate portion of the bore 72 is a radially extending exhaust passage 88 which is open to the atmosphere. Disposed within the passage 88 is a rubber-like annular element 90 which is held in position by an annular metal retainer 91. The end of the exhaust passage is closed to the entry of dirt and moisture by a flexible valve element 92 which permits easy flow of air to the atmosphere.

A stem 94 extends axially of the solenoid plunger 86 at an intermediate portion of the bore 72 and has an intermediate portion formed with a flange 96. Opposite sides of the flange 96 are provided with rubber valve elements 98 and 100. The flange 96 and the valve elements 98 and 100 are encapsulated in a valve cage formed by an annular plug element 102 having an opening 103 offering air passage around the stem 94. The plug element 102 is sealed relative to the walls of the bore 72. Another annular plug element 104 having an opening 105 also is sealed relative to the bore 72. The two annular elements 102 and 104 form a chamber 106 which is indicated also in FIG. 2 and is shown communicating by way of a passage 108 with the control chamber 31 at the upper side of the control piston 30.

Referring again to FIG. 3, the opening 103 in the annular element 102 is closed by the valve element 98 which is urged to the position shown by a spring 110 acting between the flange 96 and the annular plug element 104. Upon movement of the solenoid plunger 86, the valve element 98 moves out of engagement with annular plug 102 to open communication between the chamber 106, the opening 103 and radial passages 112 communicating with the exhaust passage 88. At the same time valve element 100 closes the opening 105 in annular plug element 104 to prevent communication between the chamber 106 and the bore 74 which intersects bore 72. When th solenoid 76 is deenergized, the stem 94 returns upwardly in FIG. 3 to the position shown under the urging of the spring 110.

One end of the bore 74 is provided with a conrrol port 114 which is connected to the line 14 and to treadle valve 6. The opposite end of the bore 74 is sealed by a plug 116. The bore 74 forms a relatively large chamber 118 at one end which communicates by way of a smaller bore 74 with the control port 114.

In the position shown in FIG. 3, the lower end of the solenoid valve stem 94 engages a check valve element 120 having a generally semi-spherical face which in the position shown is sealed against an annular valve lip 122 which loosely surrounds the valve stem 94 to permit air passage when valve element 120 is unseated. The valve element 120 is urged to the closed position by a spring 124 which acts between the valve element 120 and a cover plate 126 bolted in fluid tight relationship to the side of the housing section 27.

The cover plate 126 and the housing section 27 form a logic chamber 128 which communicates with a cavity 130 adjacent to the check valve 120. At the left end of the logic chamber 128 as seen in FIG. 3, is an annular element 132 which has a valve opening 134 closed by a second check valve 136. The check valve 136 is normally urged to a closed position by a spring 138.

Disposed between the two check valve elements 120 and 136 is a control plunger or piston 140 which has a rod portion 141 slidably and sealably supported in a bore 142 extending radially to the bore 74. The piston 140 is urged to the position shown by a spring 144. Pressure in the logic cavity 128 acting on the piston 140 collapses the spring 144 and moves the rod portion 141 into the passage formed by the bore 74 to restrict air passage from inlet port 114 to chamber 118. An annular groove 146 in the rod portion 141 permits limited or metered fluid flow.

OPERATION

During normal and usual brake operation, the various components are disposed in the position shown in FIG. 2 and FIG. 3. Under such conditions, actuation of the treadle valve 6 causes air under pressure to enter the control port 114 through the passage 74 and through the opening 105 in the annular member 104 to the cavity 106 from which it passes by way of the bore 108 to the control chamber 31 (FIG. 2) above the control piston 30 causing it to be moved downwardly. The control piston 30 first closes the valve element 34 on the annular lip 38 to isolate the brake chambers or actuator 15 from the exhaust port 46. Thereafter, additional downward movement of the piston 30 causes the valve element 50 to separate from the annular lip 56 so that air can be delivered from the service reservoir 13 to the delivery port 66 and through the open valve 50, 56 to the enlarged cavity 58 below the control piston 30 and through the offset passage 60 and the delivery port 62 to the actuator 15 for actuating the brakes.

To release the brakes, the operator removes his foot from the treadle valve 6 which decreases the air pressure at the control port 114 and therefore above the control piston 30 (FIG. 2) so that the piston moves upwardly to first close the valve 50, 56 and subsequently to separate the valve element 34 from the lip 38 at the upper end of the valve tube 40 so that the delivery port 62 is open to the exhaust port 46 and as a consequence air from the brake actuators 15 can be exhausted to the atmosphere to release the brakes.

Both the application and the release of the brakes under usual conditions is accomplished without restriction of air passage between the control port 114 and the control chamber 31 as if the port 114 was directly connected to the chamber 31.

ANTILOCK OPERATION

If the brakes are applied so that the wheel approach a locked condition, the electronic computer 20 sends a signal to the solenoid 76 which energizes the latter. As viewed in FIG. 3, this causes the solenoid plunger 86 to move downwardly so that the resilient valve element 100 on the stem flange 96 moves downwardly to close the opening 105 and at the same time valve element 98 opens the central passage 103 in plug element 102. As a consequence, the chamber 106 is isolated from the control port 114 and is open to the atmosphere by way of the exhaust port 88. Since the chamber 106 is in constant communication with the control cavity 31 above the piston 30 in the relay valve section, the control cavity 31 is also in communication with the exhaust port 88 and the atmosphere. This releases the brakes as described above but the passage 105 which is closed by the valve element 100 precludes the further introduction of control air from port 114 and the brakes are being automatically released even though the brake pedal continues to be depressed by the operator.

The brakes continue to be released to a point at which the wheel 17 starts accelerating toward the synchronized speed of the vehicle at which point the computer 20 deenergizes the solenoid 76. This causes the spring 110 acting against the stem flange 96 to urge the stem 94 upwardly to close valve 98, 103 and open valve 100, 105. This closes communication of the chamber 106 with the atmosphere through port 88 and at the same time opens the chamber 106 as well as the control cavity 31 of the relay valve to the control air entering the control port 114.

At the same time that the solenoid 76 is energized for the first time in the antilock cycle of operation, the stem 94 which moves downwardly as viewed in FIG. 3, to close valve 100, 105 and open the valve 98, 103, also urges the check valve 120 from its seat 122 to permit air in the control passage 74 to enter the logic cavity 128 formed between the cover plate 126 and the housing casting. The relatively high pressure air in the logic cavity 128 acts on the flow restrictor piston 140 and urges it upwardly as viewed in FIG. 3, so that the stem 141 enters the flow path of the control air entering at control port 114 and restricts its flow. However, a certain amount of air pressure is free to pass the restriction formed by an annular grove 146 and to enter the relatively large control chamber 118.

After the brakes have been released for the first time in the antilock cycle resumption of wheel rotation to the proper speed will cause the solenoid to be deenergized. This results in closing of the valve 98, 103 and opening of the valve 100, 105 so that the relatively high pressure air in the control chamber 118 passes to the chamber 106 and control chamber 31 in the relay valve and the brakes are initially applied at a relatively high rate. Thereafter the pressure is increased at a relatively slower rate because of the restriction of stem 141 and groove 146 in the control air passage 74. This operation gives a rapid transition from the brake released condition to the brake applied condition, starting the brake application rapidly and continuing brake application more slowly. This operation may be better visualized by reference to FIG. 4, showing a typical pressure increase and pressure exhaust curve during an antilock brake application cycle.

Figure 4:
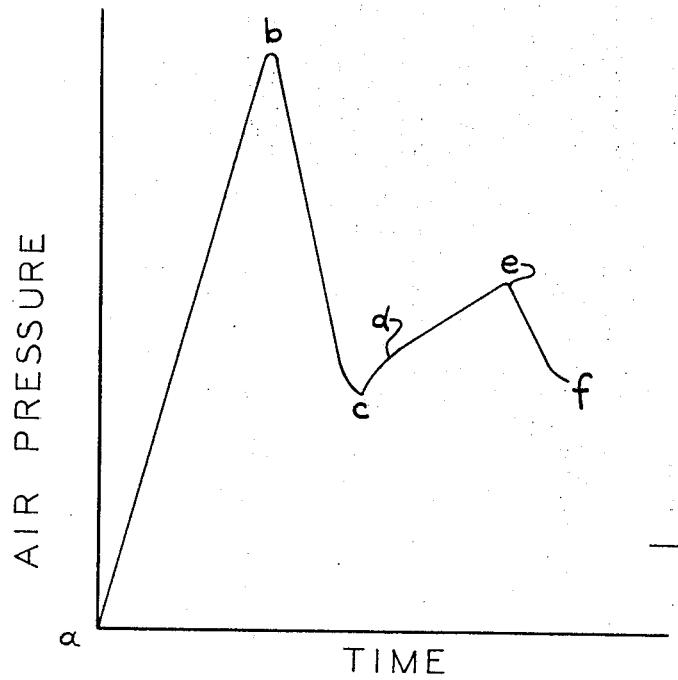
FIG. 4 is a curve illustrating the operation of a brake system incorporating the antilock control.

Referring to FIG. 4, showing a curve in which the vertical coordinate represents air pressure at the brake actuator 15 and the horizontal coordinate represents time, the initial application of brakes by the operator is represented by the curve between points *a* and *b*. Point *b* represents the point at which a potential wheel lock is signaled and the brakes are automatically released from point *b* to point *c* at which the wheel lock condition is retrieved and the wheel will resume proper rotation. The solenoid will be deenergized causing air in chamber 118 to pass to the control chamber 31 and results in an initially high pressure increase between the points *c* and *d*. Thereafter, the air pressure will increase at a relatively slower rate from point *d* to point *e* due to the retriction formed by the stem 141 in the control passage 74. As a result, the wheel lock condition is again approached but at a slower rate. Consequently the solenoid will again be energized at point *e* to release the brakes before excessive pressure is employed. At point *e*, the brakes are released again and the cycle is repeated until the vehicle comes to a stop or the operator releases the brakes at the treadle valve 6.

After the antilock stage of operation is completed and the operator releases the brakes, the air at the control port 114 exhausts through the treadle valve 6 in a manner well known in the art. Because of the pressure drop at the control port 114, the pressure in the logic cavity 128 will be relatively higher. This causes the pressure differential acting on the check valve 136 to open the latter and exhaust air from the logic cavity 128 into the control passage 74. The release of pressure in the cavity 128 permits the flow restrictor 141 to return to its original position under the urging of the spring 144. Also the air from the cavity 31 above the control piston 30 in the relay valve section is free to exhaust through the chamber 106 and through the unrestricted control passage 74 so that the mechanism returns to its original position.

The spring 124 urging the check valve 120 to a closed position is selected of a value to maintain the check valve closed until a predetermined pressure is achieved in the control passage 74. In the preferred embodiment of the invention, approximately 100 psi of air pressure is required to open the check valve. This prevents the flow restrictor 141 from restricting the control air flow when pressure in the system is below the 100 psi level. This is particularly important under certain timing requirements of brake operation which currently require that the brakes be operated in a manner so that the applied brakes can be released from a pressure of 95 psi to 5 psi in one-half second.

The present embodiment of the invention permits the various components of the antilock assembly to be operated without actually going into an antilock phase of operation. For example, with the vehicle at a complete stop, the operator can apply the treadle valve 6 with high pressure to insure that the control pressure will exceed 100 psi. This will cause the check valve 120 to open and the flow restrictor 141 will enter the passageway 74 to restrict control air flow. Subsequently, when the foot pedal pressure is released and air is exhausted from the control passage 74, the check valve 136 will open thereby relieving the air in the logic cavity 128 and will permit the flow restrictor 141 to return to its original position. Such operation insures that, at least on occasion, the critical components can be moved so that at some later, more ciritcal phase of operation, the components will not tend to stick and prevent proper operation.

It will now be seen that an air brake antilock control has been provided in which the rate at which the brakes are applied after they have been released in the antilock or antiskid phase of brake operation is regulated to produce an initially rapid rate followed by a slower rate as the brakes approach a subsequent wheel lock condition so that the brakes approach a subsequent wheel lock condition so that the brakes may again be released from a pressure level which does not unnecessarily exceed the wheel lock pressure level thereby conserving air. Moreover, the controlled rate of reapplication is achieved by a restrictor mechanism which in normal brake operations does not in anyway impede the speed of brake operations and is not affected by dynamic flow of air in the control system. The components of the restrictor are so arranged that they may be periodically operated at the will of the operator without the necessity of encountering wheel lock conditions to insure that the parts will function on the infrequent occasions that wheel antilock control is required.

While a preferred embodiment of the invention has been shown and described, it will be understood that various changes and modifications can be made without departing from the spirit of the invention.

What is claimed is:

1. In an antilock air brake system for a vehicle having means to signal the presence and absence of a lock condition at a wheel of a vehicle and a relay valve responsive to air pressure in a control line to apply and release the brakes at the wheel, the combination comprising: a wheel lock control mechanism including a housing forming an inlet connected to said control line, an outlet connected to atmosphere, and a control chamber communicating with said relay valve, passage means communicating said inlet with said control chamber, valve means having a first position in which said control chamber is open to said inlet and closed to said outlet for admitting air to apply the brakes and a second position in which said chamber is open to said outlet and closed to said inlet for releasing the brakes, solenoid means movable in response to the signal means for moving said valve means between said first and second positions, passage restricting means having a normal position adjacent to said passage means and being movable into said passage means to restrict the latter in response to a first signal from the signal means, and pressure responsive means operatively connected to said passage restricting means for maintaining the latter in said passage in the presence of air under pressure at said inlet, and independently of the movement of said valve means for reducing the flow of air from said inlet.

2. The combination set forth in claim 1 in which said passage restricting means includes a plunger slidably disposed transversely of said passage means and having an end portion movable into and out of said passage means.

3. The combination set forth in claim 1 in which said housing forms a regulating cavity connected to said passage means at a point between said valve means and said restrictor means, and one way check valve means normally closed to isolate said regulating cavity from said passage means and being movable to an open position when said valve means is in said second position to admit air from said passage means to said regulating cavity, said pressure responsive means being exposed to the pressure in said regulating cavity.

4. The combination set forth in claim 3 in which said check valve means is movable to said open position in response to movement of said solenoid means.

5. The combination set forth in claim 3 in which said pressure responsive means is in the form of a piston having a face portion exposed to the pressure in said regulating cavity.

6. The combination set forth in claim 5 in which said restrictor means is in the form of a plunger movable transversely to said passage means and in which said plunger is connected to said piston means.

7. The combination set forth in claim 3 and further comprising biasing means urging said check valve to a closed position with a predetermined force, said check valve being movable to an open position when said valve means is in said first position and in response to a pressure at said inlet acting on said check valve with a force in excess of said predetermined force.

8. The combination set forth in claim 3 and further comprising additional one way check valve means communicating said regulating cavity with said passage means at a point intermediate said inlet and said restrictor means, said additional check valve means being responsive to a pressure in said regulating cavity greater than the pressure at said inlet to open and release the pressure from said regulating cavity to permit said restrictor means to return to its normal position.

9. The combination set forth in claim 1 and further comprising a storage cavity formed by said housing and connected to said passage means at a point between said control chamber and said restrictor means, said storage cavity delivering air to said control chamber when said valve means moves from said second to said first position for initial rapid increase in pressure in said control chamber.

10. An antilock brake control mechanism for use with an air brake relay valve adapted to receive variable pressure control air to apply and release the brakes at a wheel of a vehicle and comprising: a housing having a control chamber adapted to communicate with the relay valve, an inlet port adapted to communicate with said variable pressure control air and an outlet port connected to the atmosphere, passage means between said inlet port and said control chamber, valve means having a first position in which said control chamber is open to said passage means for admitting air pressure to apply the brakes and a second position in which said chamber is open to said outlet port for exhausting air and releasing the brakes, solenoid means responsive to a wheel lock condition to move said valve means from said first to said second position and responsive to the end of the wheel lock condition to move said valve means from said second to said first position, a regulating cavity formed by said housing, first check valve means normally being closed and being responsive to movement of said valve means from said first to said second position to admit air from said passage means to said regulating cavity, second check valve means between said regulating cavity and said passage means and being responsive to pressure in said regulating cavity greater than at said inlet port to move from a normally closed position and release pressure from said cavity, and restrictor means including a plunger movable transversely of said passage and having a first position in which said plunger is out of said passage and a second position in which said plunger is disposed in said passage means to restrict fluid flow therein, said plunger having a pressure responsive portion in said regulating cavity responsive to pressure therein to move said plunger to said second position to restrict fluid flow from said inlet port to said control chamber.

11. The antilock brake control mechanism defined in claim 10 and further comprising a storage cavity formed in said housing and communicating with said passage means between said restrictor means and said control chamber, said storage cavity delivering air to said control chamber when said valve means moves from said second to said first position for initial rapid increase in pressure in said control chamber.

12. The antilock brake control mechanism defined in claim 10 in which said first check valve means is responsive to pressure in said passage means in excess of a predetermined amount and in the absence of a wheel lock signal to open and admit air to said regulating cavity.

* * * * *

UNITED STATES PATENT OFFICE
CERTIFICATE OF CORRECTION

Patent No. 3,823,987     Dated July 16, 1974

Inventor(s) Sham L. Kurichh

It is certified that error appears in the above-identified patent and that said Letters Patent are hereby corrected as shown below:

In column 2, line 65, "48" should read --50--.

In column 3, line 24, --member-- should be inserted after "tubular"; line 36, "is" should be --are--; and line 61, "menas" should be --means--.

In column 4, line 37, "conrrol" should be --control--.

In column 6, line 19, "grove" should be groove; line 47, "retrieved" should be --relieved--; and line 54, "retriction" should be --restriction.

In column 7, line 53, "anyway" should be --any way--.

Signed and sealed this 8th day of October 1974.

(SEAL)
Attest:

McCOY M. GIBSON JR.         C. MARSHALL DANN
Attesting Officer           Commissioner of Patents